United States Patent [19]

Go et al.

[11] Patent Number: 4,766,580
[45] Date of Patent: Aug. 23, 1988

[54] INFORMATION REPRODUCING SYSTEM WITH IMPROVED RESPONSE TO INTERMITTENT POWER SUPPLY

[75] Inventors: Yasunao Go; Yoshiharu Ueki; Minoru Motohashi; Kouzou Nozawa; Norihisa Urayama, all of Saitama, Japan

[73] Assignee: Pioneer Electronic Corporation, Tokyo, Japan

[21] Appl. No.: 781,588

[22] Filed: Sep. 30, 1985

[30] Foreign Application Priority Data

Sep. 29, 1984 [JP] Japan ............................ 59-148290[U]
Sep. 29, 1984 [JP] Japan ............................ 59-148291[U]
Sep. 29, 1984 [JP] Japan ............................ 59-148292[U]

[51] Int. Cl.⁴ ......................... G11B 31/00; G11B 5/00
[52] U.S. Cl. .......................................... 369/21; 369/6;
455/115; 455/127; 455/296; 455/297; 360/137
[58] Field of Search ............... 455/127, 296, 297, 115;
360/137; 369/21, 6

[56] References Cited

U.S. PATENT DOCUMENTS 4,323,787  4/1982  Sato et al. .......................... 369/21 X
4,356,481 10/1982  Kuki ................................. 455/115 X
4,380,809  4/1983  Sato ................................. 369/21 X

*Primary Examiner*—Robert L. Richardson
*Attorney, Agent, or Firm*—Sughrue, Mion, Zinn, Macpeak and Seas

[57] ABSTRACT

An information reproducing system, such as an audio tape player, for automotive use, whereby errors which would otherwise occur when the engine is started are inhibited. The information reproducing system of the invention includes a voltage detector circuit for detecting the voltage of the automobile's battery, an operating unit for operating the recording medium in response to the supply of power from the battery so as to reproduce information stored on the recording medium, and a control unit for controlling the operating unit. In this system, the application of an operation command input to the control unit is inhibited when the voltage detector circuit detects a drop in the voltage of the battery at the time the engine is started. In addition, the inhibition of the operation command input is cancelled when the restoration of the voltage of the battery is detected.

21 Claims, 6 Drawing Sheets

INFORMATION REPRODUCING SYSTEM WITH IMPROVED RESPONSE TO INTERMITTENT POWER SUPPLY

BACKGROUND OF THE INVENTION

The present invention relates to an information reproducing system for use in an automobile, specifically, an automotive stereo system or an automotive digital audio disk player.

FIG. 1 is a block diagram of a conventional information reproducing system for use in an automobile. In FIG. 1, reference numeral 1 refers to a control unit composed of, for example, a microcomputer which is supplied with a constant voltage from a constant-voltage circuit 2; 3 is a display which indicates the specific state of operations designated by the control unit 1; 4 is an operating unit for driving or otherwise operating a recording medium such as cassette tape in a car stereo; 5 is a detector circuit composed of resistors $R_1$ and $R_2$ and a zener diode D for detecting the on or off state of a switch 6 (e.g., an automotive accessory switch) by supplying the control unit 1 with a high- or low-voltage signal in response to the turning on or off of this switch; and 7 is an automotive battery.

The operation of the system shown in FIG. 1 is as follows. The control unit 1 is continuously supplied with a constant voltage from the circuit 2. When the switch) 6 (such as an accessory switch is turned on, a high-voltage signal is applied to the control unit 1 through the detector circuit 5, with the result that the control unit 1 is enabled. If a recording medium such as a cassette (not shown) is loaded, the control unit 1 causes the display 3 to indicate that event and permits the unit 4 to start operating for information reproduction. When the switch 6 is turned off, the control unit 1 is disabled to allow the unit 4 to cease its operation.

As shown in FIG. 2, the voltage of the battery 7 usually drops by a great degree when the engine starter is switched on. Because of this rapid voltage drop, the conventional information reproducing system for use in an automobile is highly likely to cause an error when the engine is started.

FIG. 3 shows a block diagram of another conventional information reproducing system for use in an automobile. In FIG. 3, 1 is a control unit composed of, for example, a microcomputer which is supplied with a constant voltage from a constant-voltage circuit 2; 3 is a display which indicates the specific state of operations designated by control unit 1; 4 is an operating unit for driving or otherwise operating a recording medium such as cassette tape in a car stereo; 5 is a detector circuit composed of resistors $R_1$ and $R_2$ and a zener diode D for detecting the on or off state of a switch 6 (e.g., an automotive accessory switch) by supplying the control unit 1 with a high- or low-voltage signal in response to the turning on or off of the switch; 7 is an automotive battery for supplying power; 8 is a voltage detector circuit for detecting the voltage of the battery 7 and supplying the control unit 1 with the detected state, for example, a voltage drop that occurs when the automotive engine starter is switched on; 9 is an operation detector circuit which detects the state of the operation of the unit 4 and supplies this information to the control unit 1; 10 is an equalizer amplifier provided in the path of an information signal reproduced from the recording medium; 11 is a power amplifier; and 12 is a speaker. The amplifiers 10 and 11, as well as the speaker 12, receive power from the battery 7.

The operation of the system shown in FIG. 3 is as follows. If the operating unit 4, receiving an operation command signal from the control unit 1, does not complete a desired operation within a predetermined time, the operation detector circuit 9 senses this failure and sends an error signal to the control unit 1. Then, the control unit 1 inhibits the subsequent operations of the unit 4 on the assumption that trouble has occurred.

As shown in FIG. 2, the voltage of the battery 7 drops so rapidly at the time of engine start that the chance of the occurrence of an error in the operation of the unit 4 is increased. In order to avoid this problem, the system shown in FIG. 3 is so designed that when, at the time of starting the engine, the voltage of the battery 7 drops below a threshold level which could cause erroneous operation of the operating unit 4, the voltage detector circuit 8 detects this drop (FIG. 4, waveforms (a) and (b)), and the control unit 1 mutes the output information signal (FIG. 4, waveform (c)), switches off the display 3 (FIG. 4, waveform (d)), causes the operating unit 4 to stop operating (FIG. 4, waveform (e)), or inhibits the operation detector circuit 9 from performing sensing operation (FIG. 4, waveform (f)).

Because of these design features, even if the operating unit 4 does not complete the intended operation within a predetermined time, the operation detector circuit 9 will not produce an error signal that inhibits operations, pending the restoration of the voltage of the battery, and there will be no problem as the pinch rollers coming to a stop while they are in contact with the capstan.

A delay time $t_1$ is provided between the occurrence of a signal for the detection of a voltage drop and the production of a signal for muting the output information signal or a signal for switching off the display 3 or operation detector circuit 9, and this delay time prevents erroneous operations that would otherwise occur. The operation of the unit 4 ceases a predetermined time $t_2$ after the output information signal has been muted. This delay time is provided for the purpose of preventing the reproduction of any abnormal sound that may occur if the operation of the unit 4 is ceased before the muting is effected. When the voltage drop detection signal has disappeared, a delay time $t_3$ is provided before the display 3 turns on the operating unit 4 or the operation detector circuit 9 is enabled, which delay time is provided for the purpose of preventing an erroneous operation that may otherwise result.

With a view toward enhancing the output power, the recent automotive information reproducing systems use a capacitor of large capacitance in a power source for the power amplifier 11. This, however, causes a drop in the voltage of the battery 7 not only when the engine is started but also when the power amplifier 11 is actuated (see FIG. 7). Therefore, the conventional system shown in FIG. 3 is defective in that the operating unit 4 is also disabled when the power amplifier 11 is turned on.

FIG. 5 is a block diagram of still another conventional information reproducing system for use in an automobile. In FIG. 5, 1 is a control unit composed of, for example, a microcomputer which is supplied with a constant voltage from a constant-voltage circuit 2; 3 is a display which indicates the specific state of operations designated by control unit 1; 4 is an operating unit for driving or otherwise operating a recording medium such as cassette tape in a car stereo; 5 is a detector circuit composed of resistors $R_1$ and $R_2$ and a zener diode D for detecting the on or off state of a switch 6 (e.g., an automotive accessory switch) by supplying the control unit 1 with a high- or low-voltage signal in response to the turning on or off of the switch; 7 is an automotive battery; and 9 is an operation detector circuit that supplies the control 1 with the result of detection of the state of operation of the operating unit 4.

The operation of the system shown in FIG. 5 is as follows. The control unit 1 is continuously supplied with a constant voltage from the circuit 2. When the switch 6 is turned on, a high-voltage signal is applied to the control unit 1 through the detector circuit 5, with the result that the control unit 1 is enabled. If a recording medium such as a cassette (not shown) is loaded, the control unit 1 causes the display 3 to indicate that event and permits the unit 4 to start to operate for information reproduction. When the switch 6 is turned off, the control unit 1 is disabled, allowing the unit 4 to stop operating. The system shown above is capable of fairly satisfactory control over the operation and stoppage of the operating unit 4 by turning on or off the switch 6.

If the operating unit 4 does not complete the intended operation within a predetermined time in response to a command from the control unit 1, the operation detector circuit 9 will sense this failure. The control unit 1 then causes the operating unit 4 to stop operating and suspends subsequent operations unless a play button or other operating button is depressed again.

As shown in FIG. 2, the voltage of the battery 7 (FIG. 5) usually drops by a great degree when the engine starter is switched on. Because of this rapid voltage drop, the conventional information reproducing system for use in an automobile is highly likely to cause an error when the engine is started. If this error is detected by the operation detector circuit, the operation of the operating unit is not restored unless it is actuated by manual command. This is inconvenient. Moreover, if the user fails to recognize that the operating unit has stopped in the play mode, the pinch rollers will remain in contact with the capstan and may deform it in an extreme case.

SUMMARY OF THE INVENTION

To overcome the above drawbacks of the prior art, the invention provides an information reproducing system for use in an automobile, comprising a voltage detector circuit for detecting the voltage of the battery of the automobile, operating means for operating a recording medium in response to the supply of power from the battery so as to reproduce information from the recording medium, and control means for controlling the operating means such that the application of an operation command input to the control means is inhibited when the voltage detector circuit detects a drop in the voltage of the battery at the time the engine is started, and the inhibition of the operation command input is cancelled when the restoration of the voltage has been detected by the voltage detector circuit.

In accordance with another aspect of the present invention, an information reproducing system for use in an automobile is provided including a voltage detector circuit for detecting the voltage of the battery of the automobile, operating means for operating a recording medium in response to the supply of power from the battery so as to reproduce information from the recording medium, control means for controlling the operating means, and a power amplifier that receives power from the battery and amplifies an information signal reproduced from the recording medium. The control means inhibits the operation of the operating means when the voltage detector circuit has detected a drop in the voltage of the battery at the time of the start of the engine, and the control means does not inhibit the operation of the operating means when the voltage detector circuit has detected a drop in the voltage of the battery at the time the power amplifier is actuated.

According to still another aspect of the present invention, an information reproducing system for use in an automobile is provided including a voltage detector circuit for detecting the voltage of the battery, operating means for operating a recording medium in response to the supply of power from the battery so as to reproduce information from the recording medium, control means for controlling the operating means, and operation detector means for detecting the specific state of the operation of the operating means. The operation detector means is inhibited from performing a sensing operation when the voltage detector circuit has detected a drop in the voltage of the battery when the engine is started. Inhibition of the sensing operation is cancelled when the voltage of the battery is restored.

DESCRIPTION OF THE PREFERRED EMBODIMENTS

Figure 1:
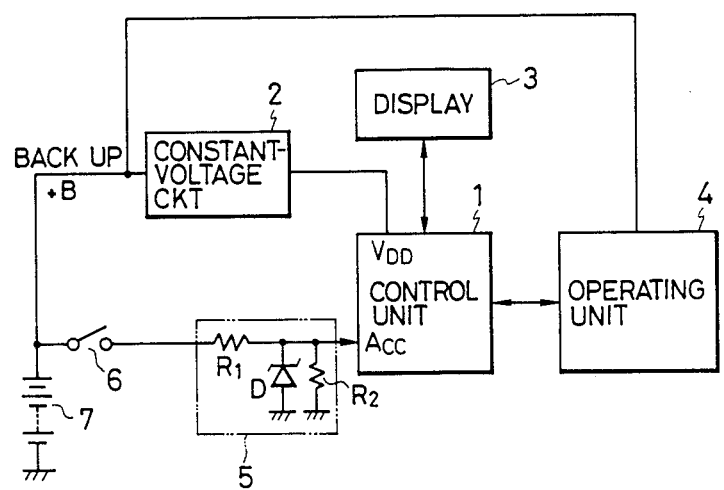
FIG. 1 is a block diagram of a conventional information reproducing system for use in an automobile.
Figure 6:
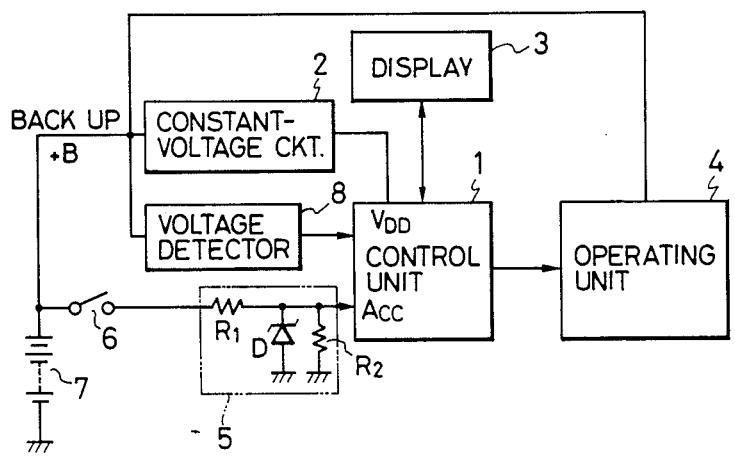
FIG. 6 is a block diagram of an information reproducing system for use in an automobile in accordance with the present invention.

FIG. 6 shows a block diagram of an information reproducing system for use in an automobile in accordance with the present invention. In FIG. 6, the components which are the same as those shown in FIG. 1 are identified by like numerals and are not described further in detail.

The system of this embodiment of the present invention is characterized by the addition of a voltage detector circuit 8 which detects the voltage of the battery 7 and supplies its state to the control unit 1.

The operation of the system of the present invention shown in FIG. 6 is as follows.

The control unit 1 is continuously supplied with a constant voltage from the constant-voltage circuit 2. When the switch 6 is turned on, a high-voltage signal is applied to the control unit 1 through the detector circuit 5, with the result that the control unit 1 is enabled. If a recording medium such as a cassette (not shown) is loaded, the control unit 1 causes the display to indicate that event and permits the unit 4 to start to operate for information reproduction. When the switch 6 is turned off, the control unit 1 is disabled and allows the unit 4 to cease its operation. The procedures up to this point are identical to those for the system shown in FIG. 1.

Figure 2:
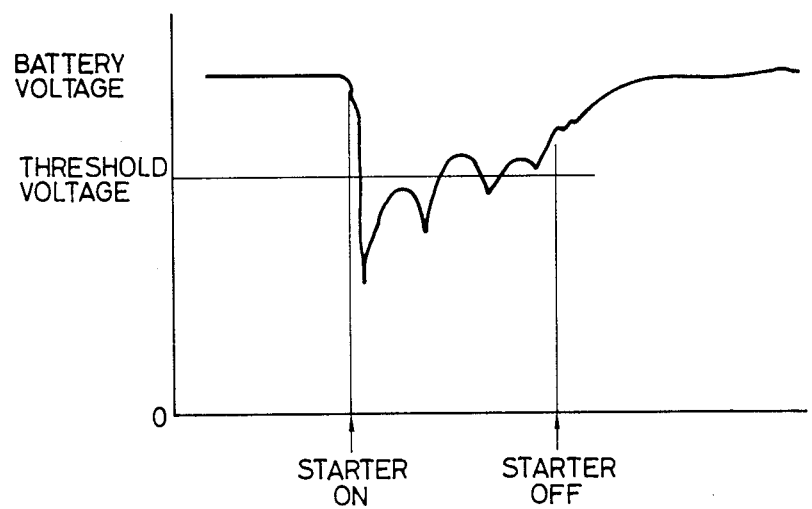
FIG. 2 shows the waveform of a voltage generated from a battery during the operation of the system shown in FIG. 3.
Figure 7:
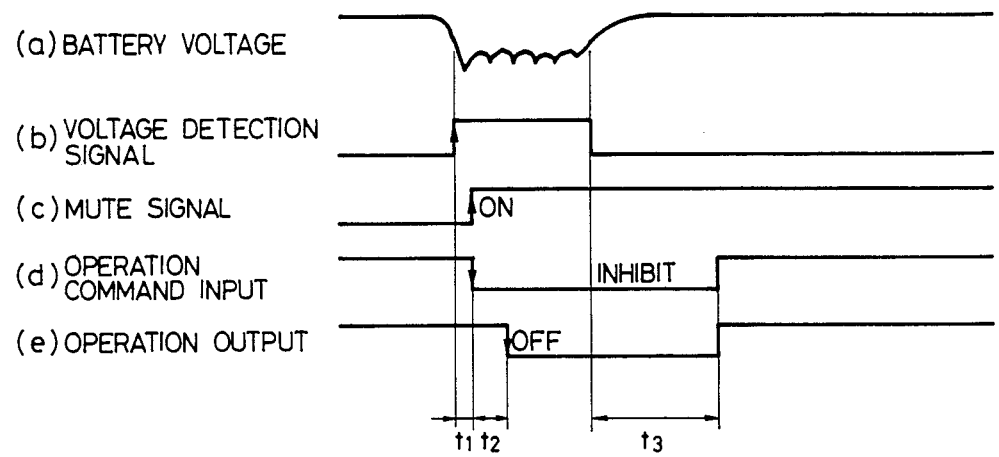
FIG. 7 is a timing chart of signals generated in the system of the present invention.

As already mentioned with reference to FIG. 2, the voltage of the battery 7 drops so rapidly at the time of engine start that the chance of the occurrence of an error in the operation of the unit 4 is increased. In order to avoid this problem, the system of the present invention is so designed that when, at the time of starting the engine, the voltage of the battery 7 drops below the threshold level for erroneous operation of the operating unit 4, the voltage detection circuit 8 detects this drop (FIG. 7, waveforms (a) and (b)), and the control unit 1 mutes the output information signal (FIG. 7, waveform (c)), inhibits the supply of an operation command signal to the control unit 1 (FIG. 7, waveform (d)), and disables the operating unit 4 (FIG. 7, waveform (e)). Therefore, even if the switch 6 is turned on at the time the engine is started, the control unit 1 will not respond to this event, and accepts only a signal for restoration of the voltage, thereby preventing the occurrence of an erroneous operation of the unit 4.

When the voltage of the battery 7 is restored, the control unit 1 accepts an incoming operation command signal and enables the operating unit 4. The muting of the output information signal is cancelled in a later step, for example, simultaneously with the start of a play mode.

A delay time $t_1$ is provided between the occurrence of a signal for the detection of a voltage drop and the production of a signal for muting the output information signal or a signal for inhibiting the acceptance of an operation command input, which delay time prevents erroneous operations that would otherwise occur. The operation of the unit 4 ceases a predetermined time $t_2$ after the output information signal has been muted. This delay time is provided for the purpose of preventing the reproduction of any abnormal sound that would occur if the operation of the unit 4 were ceased before muting is realized. In addition, when the voltage of the battery 7 is restored, the control unit 1 enables the operating unit 4 and accepts an operation command input a predetermined time $t_3$ after the voltage drop detection signal has disappeared. This delay time is also provided for the purpose of preventing erroneous operations that may otherwise result.

As described above, the system of the present invention has a minimum chance of wrong operation since it is so designed that the application of an operation command input to the control unit is inhibited when the voltage detector circuit detects a drop in the voltage of the battery at the time of engine start.

Figure 3:
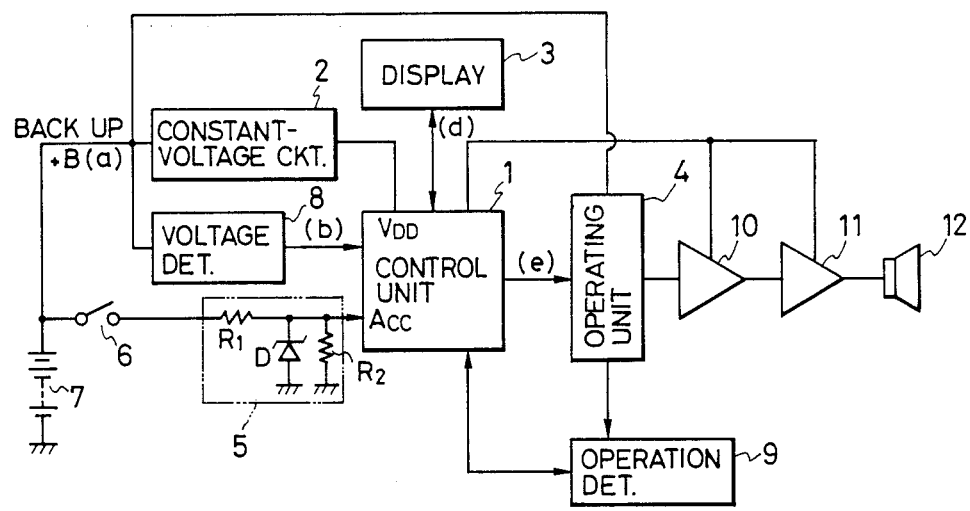
FIG. 3 is a block diagram of another conventional information reproducing system for use in an automobile.
Figure 4:
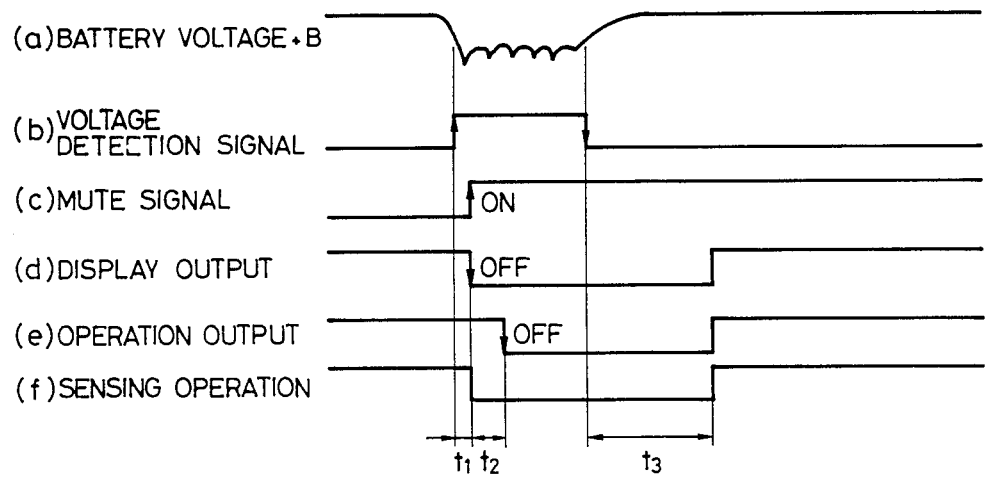
FIG. 4 is a timing chart of the signals generated in this conventional system.
Figure 8:
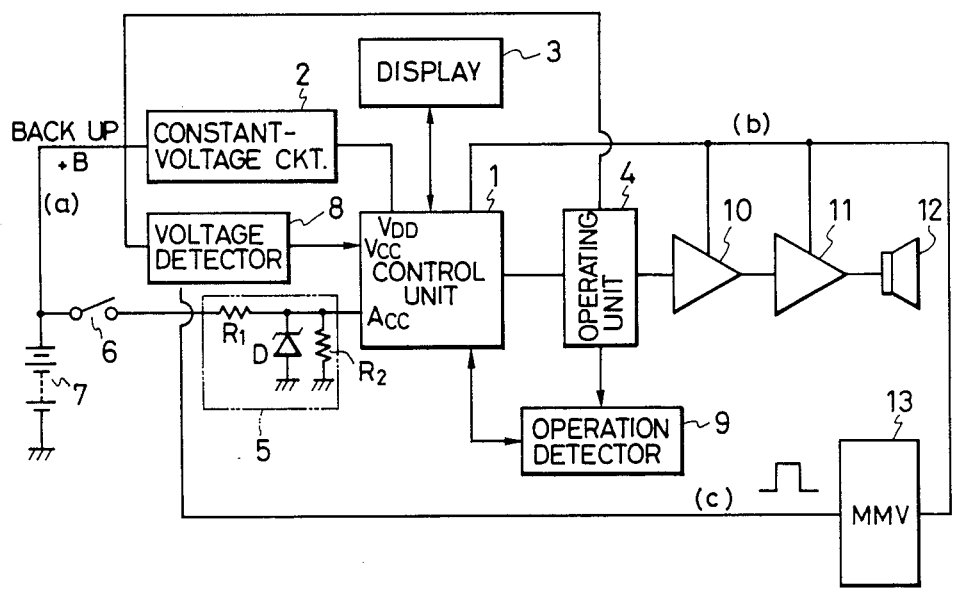
FIG. 8 is a block diagram of another embodiment of an information reproducing system for use in an automobile in accordance with the present invention.

FIG. 8 shows a block diagram of a second embodiment of an information reproducing system for use in an automobile in accordance with the present invention. In FIG. 8, the components which are the same as those shown in FIG. 3 are identified by like numerals and are not described in detail. The system includes a monostable multivibrator 13 that is triggered by a start signal amplifier 10 and power amplifier 11. The triggered monostable multivibrator 13 delivers a pulse of a predetermined width $t_a$ to the voltage detector circuit 8. The pulse width $t_a$ is determined in association with the time necessary for the voltage of the battery that has dropped upon actuation of the power amplifier 11 to be restored to the normal level.

The operation of the system of the present invention shown in FIG. 8 is as follows:

The control unit 1 is continuously supplied with a constant voltage from the constant-voltage circuit 2. When the switch 6 is turned on, a high-voltage signal is applied to the control unit 1 through the detector circuit 5, with the result that the control unit 1 is enabled. If a recording medium such as a cassette (not shown) is loaded, the control unit 1 causes the display 3 to indicate the event and permits the unit 4 to start to operate for information reproduction. At the same time, the control unit 1 sends a start signal to the equalizer amplifier 10 and power amplifier 11 to turn them on. Music or other audio information reproduced from the cassette is supplied to the speaker 12 through the equalizer amplifier 10 and power amplifier 11 for producing audible sound. If the operation detector circuit 9 detects the fact that the operating unit 4 has not completed the intended operation within a predetermined time, the control unit 1 will inhibit the unit 4 from performing subsequent operations. If the switch 6 is turned off, the control unit 1 is disabled to bring the operation of the unit 4 to a stop.

When, at the time of engine start, the voltage detector circuit 8 senses that the voltage of the battery 7 has dropped to a level below a predetermined value, the control unit 1 keeps sending a signal to the operating unit as long as the voltage of the battery is below the predetermined level, and the operation of the unit 4 is discontinued or the sending operation of the detector circuit 9 is stopped. At the same time, the reproduced sound is muted or the display 3 is turned off. The control unit 1 may be inhibited from receiving an operation command input as long as the muting mode continues.

When the voltage of the battery is restored, the control unit 1 enables the operating unit 4. If the pinch rollers and capstan have remained in contact, the operating unit 4 is brought into a release mode so that the rollers are disengaged from the capstan. At the same time, the control unit 1 cancels the inhibition of the indicating operation of the display 3, the sensing operation of the detector circuit 9, or the supply of an operation command input signal to the control unit 1. The muting of the output information signal is cancelled simultaneously with a later step, for example, the start of a play mode. The procedures up to this point are identical to those for the system shown in FIG. 3.

Figure 9:
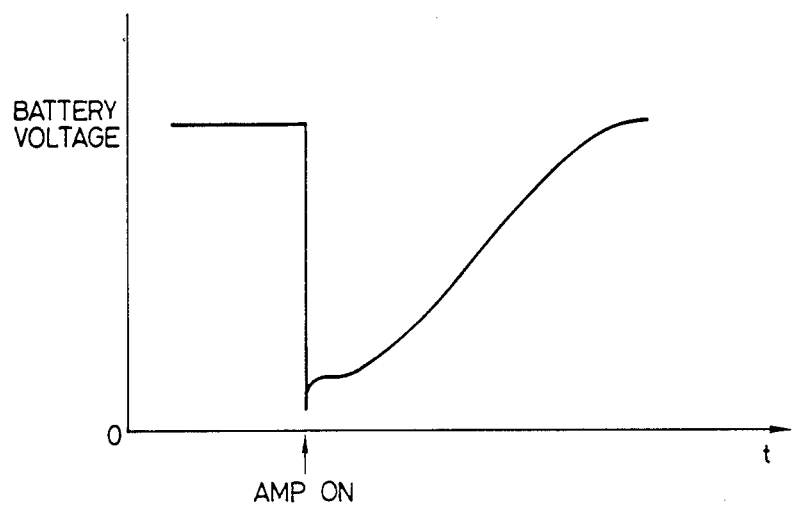
FIG. 9 shows the waveform of the voltage generated from the battery during the operation of the system shown in FIG. 8.
Figure 10:
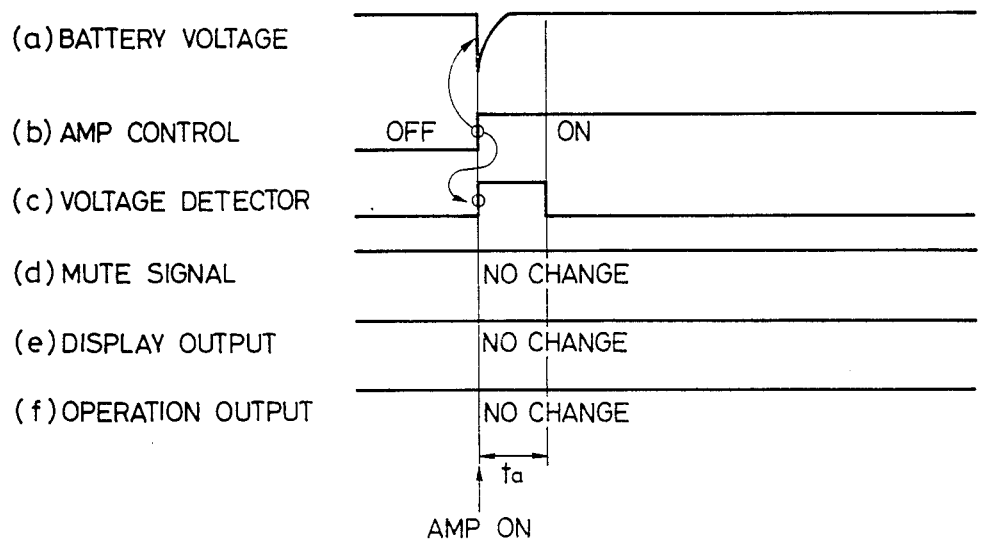
FIG. 10 is a timing chart of signals generated in the system shown in FIG. 9.

When a start signal is applied to the amplifiers 11 and 12 and the voltage of the battery 7 drops (FIG. 8, and FIG. 9, waveforms (a) and (b)), the same start signal is applied to the monostable multivibrator 13, which delivers a pulse of width $t_{IG}$ waveform (c)). As long as this pulse is applied, the voltage detector circuit 8 is substantially inhibited from performing a sending operation (i.e., at least a signal indicative of the voltage drop is inhibited from being delivered). Therefore, as long as the pulse $t_a$ is on, the output information signal is not muted, the indicating operation of the display 3 is not inhibited, and the operation of the unit 4 is not stopped (FIG. 10, waveforms (d), (e) and (f)).

As shown above, the system of the present invention inhibits the voltage detector circuit from operating when the power amplifier is actuated. This eliminates the chance of stoppage of the operation of the operating unit that would otherwise occur in the conventional system at the time of actuation of the power amplifier.

Figure 5:
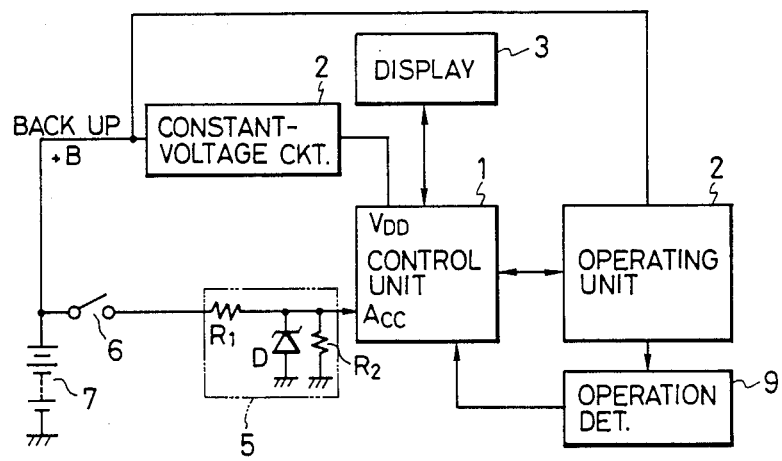
FIG. 5 is a block diagram of a third conventional information reproducing system for use in an automobile.
Figure 11:
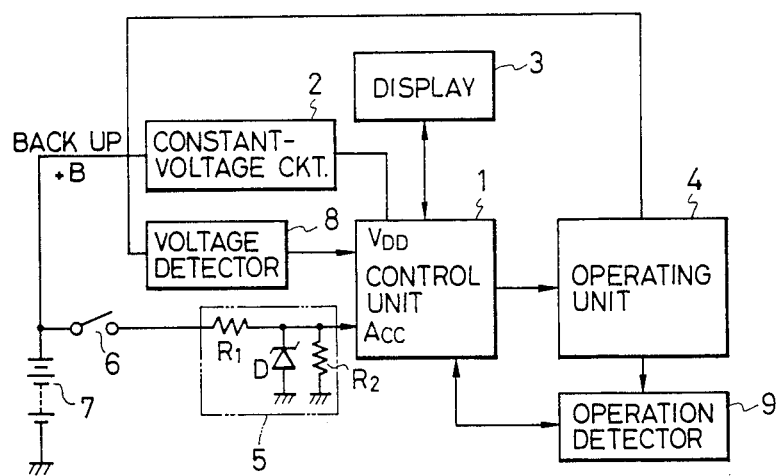
FIG. 11 is a block diagram of a third embodiment of an information reproducing system for use in an automobile in accordance with the present invention.

FIG. 11 shows a block diagram of a third embodiment of an information reproducing system for use in an automobile in accordance with the present invention. In FIG. 11, components which are the same as those shown in FIG. 5 are identified by like numerals and are not described further in detail. This embodiment of the present invention is characterized by addition of a voltage detector circuit 8 which detects the voltage of the battery 7 and supplies its state to the control unit 1.

The operation of the system of the present invention shown in FIG. 11 is as follows. The control unit is continuously supplied with a constant voltage from the constant-voltage circuit 2. When the switch 6 is turned on, a high-voltage signal is applied to the control unit 1 through the detector circuit 5, with the result that the control unit 1 is enabled. If a recording medium such as a cassette (not shown) is loaded, the control unit 1 causes the display 3 to indicate that event and permits the unit 4 to start to operate for information reproduction. When the switch 6 is turned off, the control unit 1 is disabled to allow the unit 4 to stop operating. If the operating unit 4 does not complete the intended operation within a predetermined time in response to a command from the control unit 1, the operation detector circuit 9 senses this failure. The control unit 1 will then cause the operating unit 4 to stop operating and suspend subsequent operations. The procedures up to this point are identical to those for the system shown in FIG. 5.

As already mentioned with reference to FIG. 5, the voltage of the battery 7 drops so rapidly at the time of engine start that the chance of the occurrence of an error in the operation of the unit 4 is increased. In order to avoid this problem, the system of the present invention is so designed that when, at the time of engine start, the voltage of the battery 7 drops below the threshold level for erroneous operation of the operating unit 4, the voltage detector circuit 8 detects this drop (FIG. 12, waveform (a) and (b)), and the control unit 1 mutes the output information signal (FIG. 12, waveform (c)), inhibits the display 3 from performing indication (FIG. 12, waveform (d)) and disables the operation of the unit 4 (FIG. 12, waveform (e)). In addition, a signal is sent to the operation detector circuit 9 in substantial synchronism with the muting operation so as to inhibit that circuit from performing a sensing operation (FIG. 12, waveform (f)). Therefore, even if the operating unit 4 does not complete the intended operation within a predetermined time after a voltage drop, the operating detector circuit 9 will not deliver an error signal; as a result, the operating unit 4 is inhibited from performing operations that would otherwise occur subsequent to the restoration of the battery's voltage, and hence no such trouble as forced contact between the pinch rollers and the capstan will occur.

Figure 12:
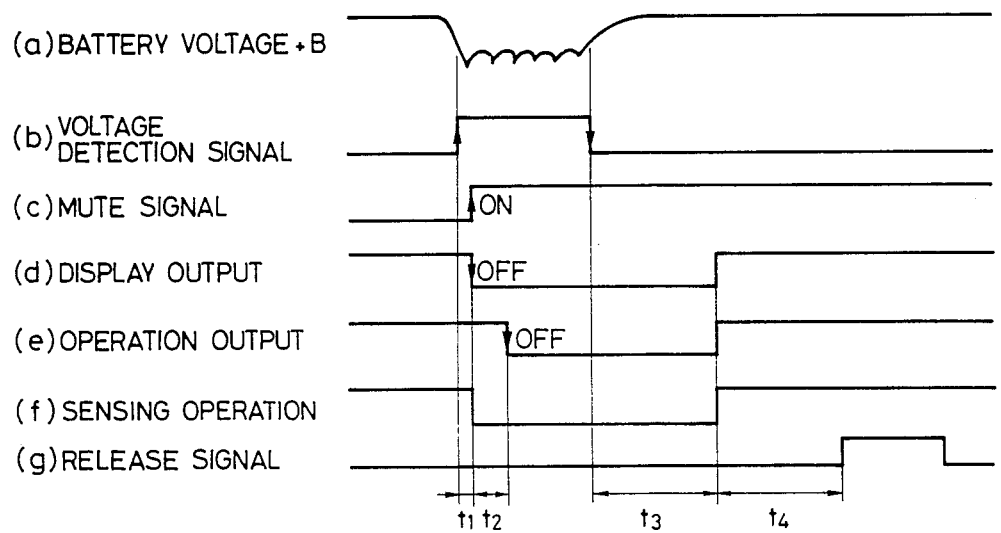
FIG. 12 is a timing chart of signals generated in the system of FIG. 10.

When the voltage of the battery 7 is restored, the control unit 1 cancels the inhibition of the indicating operation of the display 3 and the sensing operation of the operation detector circuit 9 (FIG. 12, waveforms (d) and (f)), and disables command to the operating unit 4 (FIG. 12, waveform (e)). After cancelling the disable signal, the control unit 1 delivers a release signal to the operating unit 4. If the operating unit 4 is so designed as to drive the pinch rollers, magnetic head, other components by a "power assist" mechanism, the flywheel or other components will come to a stop without completing their operation because of the voltage drop. The release signal to the operating unit 4 will, however, cause such components to return to the positions at which they started to operate. Therefore, when the voltage of the battery 7 is restored, when the operation detector circuit 9 resumes its sensing operation, it detects the fact that the operating unit 4 was in the midst of performing a certain operation, and thereby avoids the inhibition of the subsequent sequential operation of the unit 4. For example, if the detected fact is the loading of the cassette, the control unit 1 will control the operating unit 4 so that it will proceed to a play mode. After the restoration of the battery's voltage, the muting mode is cancelled almost simultaneously with the start of play mode.

A delay time $t_1$ is provided between the occurrence of a signal for the detection of a voltage drop and the production of a signal for muting the output information signal, or a signal for inhibiting the indicating operation of the display 3, or a signal for inhibiting the operation detector circuit 8 from performing a sensing operation. This delay time prevents an erroneous operation that would otherwise occur. The operating unit 4 will be disabled a predetermined time $t_2$ after the output information signal has been muted. This delay time is provided for the purpose of preventing the reproduction of any abnormal sound that may occur if the operation of the unit 4 were ceased before the muting is realized. When the voltage of the battery 7 is restored, the control unit 1 will enable the disabled operating unit 4, display 3 and detector circuit 8. The operating unit 4 will be enabled a predetermined time $t_3$ after the voltage drop detection signal has disappeared. A delay time $t_4$ is added to $t_3$ before the operating unit 4 is brought to a release state. The delay times $t_3$ and $t_4$ are necessary for preventing erroneous operations that would otherwise result.

As described above, the system of the present invention inhibits the operation detector circuit from performing sensing operations when the voltage detector circuit has sensed a voltage drop at the time of engine start, and this feature eliminates the possibility of subsequent operations being disabled after the voltage of the battery is restored.

We claim:

1. An information reproducing system for use in an automobile including a battery for generating a predetermined voltage level for supplying power to said system, comprising: a voltage detector circuit for detecting a predetermined drop in the voltage level of said battery and for detecting the predetermined voltage level, operating means for receiving the power supplied from said battery and reproducing information from that which has been stored on a recording medium, and control means for controlling the reproduction of the information by said operating means in response to an operation command input, and means for inhibiting said control means from responding to the operation command input when said voltage detector circuit has detected at least the predetermined drop in the voltage level of said battery until said voltage detector circuit detects the predetermined voltage level.

2. The information reprocing system according to claim 1, wherein the application of said operation command input is inhibited after the lapse of a predetermined time following the detection of a drop in said voltage.

3. The information reproducing system according to claim 1, wherein said control means disables said operating means in response to detection of a drop in said voltage.

4. The information reproducing according to claim 3, wherein said operating means is disabled after the lapse of a predetermined time following the detection of a drop in said voltage.

5. The information reproducing system according to claim 3, wherein a reproduced signal of said information is muted before said operating means is disabled.

6. The information reproducing system according to claim 3, wherein the disabled operating means is enabled after the lapse of a predetermined time following the detection of the restoration of said voltage.

7. The information reproducing system according to claim 1, wherein the inhibition of said operation command signal is cancelled after the lapse of a predetermined time following the detection of the restoration of said voltage.

8. An information reproducing system for use in an automobile including a battery for generating a predetermined voltage level for supplying power to said system, said system comprising: a voltage detector circuit for detecting a predetermined drop in the voltage level of said battery, operating means for receiving the power supplied from said battery and being actuable for reproducing an information signal from that which has been stored on a recording medium, a power amplifier for receiving the power supplied from said battery and amplifying said information siqnal reproduced from said recording medium, and control means for actuating said operating means and said power ampilifier, said control means including means for inhibiting operating means when said voltage detector control has detected at least the predetermined drop in the voltage level of said battery and preventing the inhibiting of said operating means when said voltage detector circuit has detected at least the predetermined drop in the voltage level of said battery in response to actuation of said power amplifier.

9. The information reproducing system according to claim 8, wherein at the time of actuation of said power amplifier, said voltage detector circuit is inhibited for a predetermined duration from delivering an output indicative of a voltage drop.

10. The information reproducing system according to claim 9, wherein said voltage detector circuit is inhibited from delivering an output indicative of a voltage drop as long as said circuit is supplied with a pulse of a predetermined width from a monostable multivibrator that is triggered at the time of actuation of said power amplifier.

11. An information reproducing system for use in an automobile including a battery for generating a predetermined voltage level for supplying power to said system, said system comprising: a voltage detector circuit for detecting a predetermined drop in the voltage level of said battery and for detecting the predetermined voltage level, operating means for receiving the power supplied by said battery, said operating means including means, movable among various positions with respect to a recording medium having information stored thereon, for reproducing the information from said recording medium when said means for reproducing is in a play mode, operation detector means for detecting the position of said means for reproducing, and control means for controlling movement of the means for reproducing, for disabling the means for reproducing in response to an output of said operation detector means, and for inhibiting the detecting of the position of said means for reproducing when said voltage detector circuit has detected at least the predetermined drop in the voltage level of said battery until the predetermined voltage level of said battery is detected by said voltage detector means.

12. The information reproducing system according to claim 11, wherein said control means enables the disabled operating means when the voltage detector means detects the predetermined voltage level of said battery.

13. The information reproducing system according to claim 12, wherein said control means includes means for issuing a release signal when the voltage detector detects the predetermined voltage level of said battery after detecting at least the predetermined drop in the voltage level of said battery; said means for operating being responsive to said release signal to switch said means for reproducing from the play mode to a release mode in which the means for reproducing is disabled.

14. The information reproducing system according to claim 11, wherein said control means includes means for controlling said operating means, when the voltage detector detects the predetermined voltage level of said battery after detecting at least the predetermined drop in the voltage level of said battery, for switching said means for reproducing from the play mode to a release mode in which the means for reproducing is disabled, and for switching said means for reproducing from said release mode to said play mode after a predetermined period of time.

15. The information reproducing system according to claim 13, wherein said means for reproducing is switched into the release mode when a predetermined time elapses after the detection of the restoration of the predetermined voltage level of said battery.

16. An information reproducing system according to claim 11, wherein said operation detector circuit is inhibited from performing a detecting operation when a predetermined time elapses after the detection of the predetermined drop in the voltage level of said battery.

17. The information reproducing system according to claim 11, wherein said control means includes means for disabling said operating means when said voltage detector detects at least the predetermined drop in the voltage level of said batthery.

18. The information reproducing system according to claim 17, wherein said operating means is disabled when a predetermined time elapses after the detection of the predetermined drop in the voltage level of said battery.

19. The information reproducing system according to claim 17, wherein said operating means produces a signal corresponding to the information produced by said means for reproducing, and said control means includes means for muting said signal produced by said operating means before said operating means is disabled.

20. The information reproducing system according to claim 1, wherein said control means includes means for inhibiting said control means for disabling said operating unit from reproducing the information in response to the detection of at least the predetermined voltage drop.

21. The information reproducing system according to claim 1, wherein said means for inhibiting inhibits said control means from responding to the command input signal by inhibiting said control means from receiving the command input signal.

* * * * *